(12) United States Patent
Durfee et al.

(10) Patent No.: US 10,069,453 B2
(45) Date of Patent: Sep. 4, 2018

(54) METHODS AND SYSTEMS FOR SELECTING AND PROGRAMMING REPLACEMENT MOTORS

(71) Applicant: Nidec Motor Corporation, St. Louis, MO (US)

(72) Inventors: Scott J. Durfee, Wildwood, MO (US); Charles L. Geiler, Caseyville, IL (US); Chetan O. Modi, Valley Park, MO (US); Tarris A. Reed, St. Charles, MO (US); Scott M. Schroer, St. Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 15/351,084

(22) Filed: Nov. 14, 2016

(65) Prior Publication Data

US 2017/0063286 A1    Mar. 2, 2017

Related U.S. Application Data

(63) Continuation of application No. 14/558,425, filed on Dec. 2, 2014, now Pat. No. 9,571,028, which is a continuation of application No. 13/681,022, filed on Nov. 19, 2012, now Pat. No. 8,917,045.

(51) Int. Cl.
*H02P 31/00* (2006.01)
*G06F 8/60* (2018.01)

(52) U.S. Cl.
CPC ............... *H02P 31/00* (2013.01); *G06F 8/60* (2013.01)

(58) Field of Classification Search
CPC ........ H02P 31/00; G06F 15/173; G06F 17/00; G06F 9/44
USPC ................................... 318/490, 558
See application file for complete search history.

(56) References Cited

U.S. PATENT DOCUMENTS

2009/0315498 A1* 12/2009 Jeung .................. H02P 31/00
                                                    318/558

* cited by examiner

*Primary Examiner* — Bentsu Ro
(74) *Attorney, Agent, or Firm* — Hovey Williams LLP

(57) ABSTRACT

Methods and systems for replacing HVAC blower motors and other electric motors are disclosed including systems and methods for gathering and storing information about motors that may need to be replaced, systems and methods for selecting replacement motors, and systems and methods for programming the replacement motors. The systems and methods allow a select few replacement motors to be programmed to replace nearly any original motor.

15 Claims, 4 Drawing Sheets

Fig. 5.

METHODS AND SYSTEMS FOR SELECTING AND PROGRAMMING REPLACEMENT MOTORS

RELATED APPLICATION

The present application is a continuation of U.S. patent application Ser. No. 14/558,425, filed Dec. 2, 2014, entitled METHODS AND SYSTEMS FOR SELECTING AND PROGRAMMING REPLACEMENT MOTORS, which is a continuation of and claims priority from U.S. patent application Ser. No. 13/681,022, filed Nov. 19, 2012, entitled METHODS AND SYSTEMS FOR SELECTING AND PROGRAMMING REPLACEMENT MOTORS. The above-identified earlier filed applications are hereby incorporated by reference into the present application in their entireties.

BACKGROUND

Blower motors in heating, ventilating, and air conditioning (HVAC) systems often must be replaced due to normal operational wear. Most HVAC systems have motors with particular horsepower ratings and operating parameters (torque load, fan speed, rotation direction, etc.). Thus, to replace these motors, service contractors must either stock a diverse inventory of blower motors to accommodate the various different HVAC equipment or must order the motors from the OEM's or another source. Stocking every possible type, size, and rating of HVAC motor is prohibitively expensive and space consuming, especially since many of the motors may never be used, and ordering motors after repairs have been initiated causes undesirable delays that inconvenience customers and the installer. The same or similar problems occur when replacing motors in washing machines, dishwashers, and other electrically powered devices.

SUMMARY

The present invention solves the above-described problems by providing improved methods and systems for replacing HVAC blower motors and other electric motors. Embodiments of the present invention generally provide systems and methods for gathering and storing information about motors that may need to be replaced in the future, systems and methods for selecting replacement motors, and systems and methods for programming the replacement motors. The systems and methods of the present invention may be used with motors designed for HVAC systems, washing machines, dishwashers, or any other electrically-powered devices or systems.

In accordance with one aspect of the invention, motors that may need to be replaced in the future are tested to determine certain operational parameters of the motors. For example, each motor may be tested to detect the motor's: minimum operating speed, maximum operating speed, slew rate or acceleration rate, torque settings for each tap, speed settings for each tap, on-delays (delays in motor start-up after heating or air-conditioning is triggered), off-delays (delays in motor shut down after heating or air-conditioning is stopped), and/or rotation direction for each tap setting.

The detected operating parameters are then used to create a motor program for each of the tested motors that may later be used to program a replacement motor. Identification information for the tested motors as well as the programs are then stored in a computer system accessible via the Internet or other communications network.

A limited number of replacement motors are then selected that may later be used to replace the tested original motors. Information for these replacement motors is also stored in the computer system.

Once information for the tested motors and the potential replacement motors is stored in the computer system, an installer may access the computer system with a personal computing device to assist with the installation of a replacement motor. The installer first enters identification information for the motor to be replaced to see if the same type of motor was previously tested. If it was, the computer system may display certain information about the tested motor so the installer can compare it to the motor being replaced to confirm it is the same type of motor.

The computer system also uses the entered information to select a replacement motor that best matches the original motor and provides the installer identification information for the selected replacement motor. The installer uses this information to retrieve the replacement motor from a service truck or other source.

The computer system also identifies the motor program that was created for the tested motor and allows the installer to download the program. The installer may transfer the program to the selected replacement motor with a programming tool to set certain operational parameters of the replacement motor so that it mimics the operation of the replacement motor.

The present invention provides numerous advantages. For example, it can be used by a motor installer to quickly and easily identify a suitable replacement motor for an original motor. The invention also allows the installer to quickly program the selected replacement motor so that it mimics the operational parameters of the original motor. This allows an installer to stock just a few different types of replacement motors and use them to replace nearly any original motor of an HVAC system or other electrically-powered device or system. Other features and advantages of the invention are discussed in the Detailed Description section below.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 5 is an exemplary screen display that may be created with computer programs of the present invention to assist with the testing of original motors.

Figure 1:
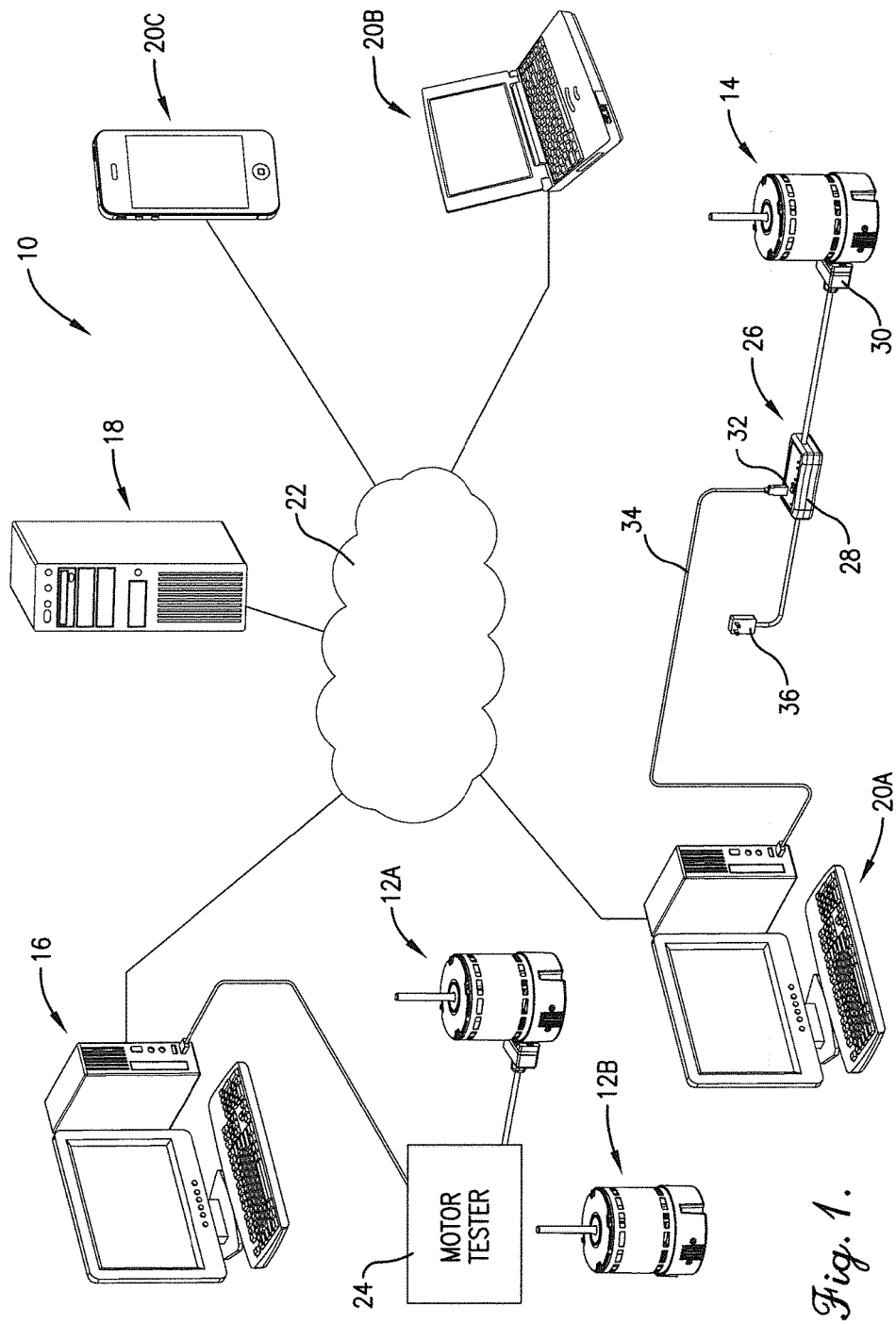
FIG. 1 is a schematic diagram of exemplary computer equipment that may be used to implement aspects of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the invention provide systems and methods for gathering and storing information about motors that may need to be replaced, systems and methods for selecting replacement motors, and systems and methods for programming the replacement motors. The systems and methods of the present invention may be used with motors designed for HVAC systems, refrigeration systems, washing machines, dishwashers, or any other electrically-powered devices or systems.

In accordance with one aspect of the invention, a number of motors that may need to be replaced in the future are tested to determine the motors' operational parameters. For example, each motor may be tested to detect its: minimum operating speed, maximum operating speed, slew rate or acceleration rate, torque settings for each tap, speed settings for each tap, on-delays (delays in motor start-up after heating or air-conditioning is triggered), off-delays (delays in motor shut down after heating or air-conditioning is stopped), and/or rotation direction for each tap setting.

The detected operating parameters are then used to create a motor program for each of the tested motors that may later be used to program a replacement motor. Identification information for the tested motors as well as the programs are then stored in a computer system accessible by other computers via the Internet or other communications network.

A limited number of replacement motors are then selected that may later be used to replace the tested original motors. Information for these replacement motors is also stored in the computer system.

Once information for the tested motors and the potential replacement motors is stored in the computer system, an installer may access the computer system with a personal computing device to assist with the installation of a replacement motor. The installer first enters identification information for the motor to be replaced to see if the same type of motor was previously tested. If it was, the computer system may display certain information about the tested motor so the installer can compare it to the motor being replaced to confirm it is the same type of motor.

The computer system also uses the entered information to select a replacement motor that best matches the original motor and provides the installer identification information for the selected replacement motor. The installer uses this information to retrieve the replacement motor from a service truck or other source.

The computer system also identifies the motor program that was created for the tested motor and allows the installer to download the program. The installer may then transfer the program to the selected replacement motor to set certain operational parameters of the replacement motor so that it mimics the operation of the replacement motor.

The motors to be replaced (also referred to herein as "original motors") may operate on direct current (DC) or alternating current (AC), may be synchronous or asynchronous, and may be single phase or three phase. The motors may be of any type, including but not limited to, permanent split capacitor (PSC) motors, brushed DC motors, switched reluctance motors, coreless or ironless DC motors, series wound universal motors, induction motors, torque motors, or stepper motors. Moreover, the motors may be fixed speed, multi-speed, or variable speed and may have any horsepower (HP) rating. In one embodiment of the invention, the motors to be replaced are ⅓-1 HP, three phase, reversible and variable speed electronic commutated motors (ECM's). However, the principles of the present invention are not limited to any particular motor type, technology, or size.

Each of the motors to be replaced may have an integral or separate motor controller that provides power to and controls operation of its motor. Each motor controller may include any combination of circuitry, hardware, firmware, and/or software and may include a plug-in interface.

Similarly, each replacement motor may operate on direct current (DC) or alternating current (AC), may be synchronous or asynchronous, and may be single phase or three phase. The replacement motors may be of any type, including but not limited to, permanent split capacitor (PSC) motors, brushed DC motors, switched reluctance motors, coreless or ironless DC motors, series wound universal motors, induction motors, torque motors, or stepper motors. Moreover, the replacement motors may be fixed speed, multi-speed, or variable speed and may have any horsepower (HP) rating.

In one embodiment of the invention, the replacement motors are ⅓-1 HP, three phase, reversible and variable speed electronic commutated motors (ECM's) designed to replace ECM's or PSC motors. The speed of an ECM can be electronically controlled and set specifically to match the airflow requirements for each application, thus permitting more efficient operation. Because ECM's may be designed to replace multi-speed PSC motors, the replacement motors may have a number of programmable taps that permit the motors to be programmed to simulate operation of multi-speed PSC motors. However, the principles of the present invention are not limited to any particular motor type, technology, or size.

Each replacement motor may also have an integral or separate motor controller that provides power to and control operation of the motor. Each motor controller may include any combination of circuitry, hardware, firmware, and/or software and may include a plug-in interface.

As mentioned above, a limited number of replacement motors are selected and used to replace virtually any original motor. When used to replace motors in HVAC systems, an embodiment of the invention may use just four replacement motors: a ⅓ HP motor, a ½ HP motor, a ¾ HP motor, and a 1 HP motor. However, other embodiments may use more or less replacement motors and/or may use motors with other HP ratings.

Aspects of the invention may be at least partially implemented with a system of computer equipment broadly referred to by the numeral 10 in FIG. 1. The system 10 is shown with several original motors 12A, 12B and a single replacement motor 14, but the principles of the invention are applicable to any number of motors.

One embodiment of the system 10 includes a computer or computer system 16, a computer or computer system 18, and one more personal computing devices 20A, 20B, 20C that all exchange data via a communications network 22. The computers in the system 10 may be operated by any persons or entities. For example, in one embodiment: the computer 16 may be operated by or for a person or entity that performs tests on original motors that may need to be replaced in the future to gather data about the motors as explained in more detail below; the computer 18 may be operated by a facilitator of the invention and stores data received from the computer 16, provides data and programs to the computing devices 20A, 20B, 20C, and performs other aspects of the invention described below; and the personal computing devices 20A, 20B, 20C may be operated by or for motor installers or service technicians who replace motors in HVAC systems, washing machines, dishwashers, or any other electrical device or system.

The components of the system 10 illustrated and described herein are merely examples of equipment that may be used to implement embodiments of the present invention and may be replaced with other equipment without departing from the scope of the present invention. Some of the illustrated components of the system 10 may also be combined. For example, the computers 16 and 18 may be combined and/or may be operated by the same persons or entities. Similarly, the aspects of the invention performed with the devices 20A-C may be performed with the computer 16.

In more detail, the computer 16 is used to test motors that may need to be replaced in the future to gather information about the motors. The computer 16 may be a desktop computer, laptop computer, server computer, or any other computing device and preferably includes or can access an Internet browser and a conventional Internet connection such as a wireless broadband connection, DSL converter, or ISDN converter so that it can access and exchange data with the computer system 18 via the communications network 22.

A motor tester 24 may be used with the computer 16 to assist with the motor tests. The motor tester 24 may be any device that can operate a motor under test conditions and monitor the motor's speed, direction, torque, tap settings, delays, and/or other operating parameters as described below. The computer 16 may be coupled with the motor tester 24 as shown via a USB cable or any other data transfer mechanism. In other embodiments, the motor tester 24 may be software residing on the computer 16.

The computer system 18 receives and stores motor test data and other information from the computer 16. The computer system 18 may also implement one or more computer programs for performing some of the functions described herein and may provide a web-based portal that can be accessed by the computer 16, the personal computing devices 20A, 20B, 20C, and other computers.

Embodiments of the computer system 18 may include one or more servers running Windows; LAMP (Linux, Apache HTTP server, MySQL, and PHP/Perl/Python); Java; AJAX; NT; Novel Netware; Unix; or any other software system. The computer system 18 includes or has access to computer memory and other hardware and software for receiving, storing, accessing, and transmitting information as described below. The computer system 18 may also include conventional web hosting operating software, searching algorithms, an Internet connection, and is assigned a URL and corresponding domain name so that it can be accessed via the Internet in a conventional manner.

The personal computing devices 20A, 20B, 20C may be any devices used by motor installers or service technicians while replacing motors in HVAC systems or other electrically-powered devices or systems. The personal computing devices 20A, 20B, 20C may be laptop computers, tablet computers, mobile phones, or similar devices as shown. Each personal computing device preferably includes or can access an Internet browser and a conventional Internet connection such as a wireless broadband connection, DSL converter, or ISDN converter so that it can receive communications from the computer system 18 via the communications network 22.

The communications network 22 is preferably the Internet but may be any other communications network such as a local area network, a wide area network, or an intranet. The communications network may include or be in communication with a wireless network capable of supporting wireless communications such as the wireless networks operated by AT&T, Verizon, or Sprint. The wireless network may include conventional switching and routing equipment. The communications network 22 and wireless network may also be combined or implemented with several different networks.

Figure 2:
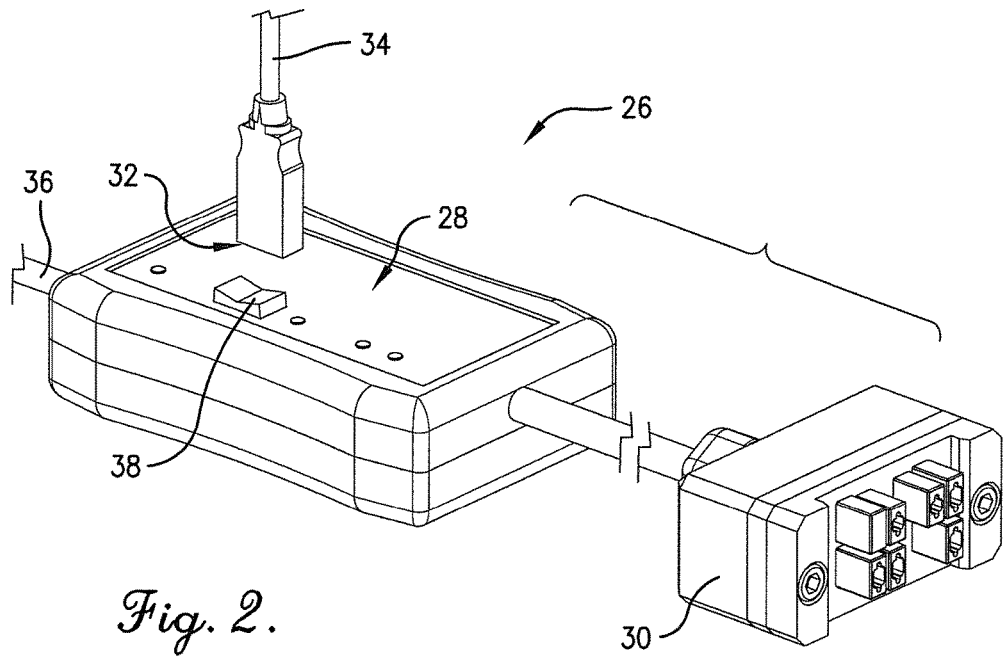
FIG. 2 is a perspective view of a programming tool that may be used to implement aspects of the present invention.

Embodiments of the invention may also include a programming tool 26 illustrated in FIGS. 1 and 2 for use in programming a replacement motor 14 to mimic the operation of an original motor 12A or 12B. An embodiment of the programming tool 26 includes a control device 28, a connector and cable 30 for coupling with an interface on a replacement motor 14, a USB port 32 for coupling with one of the personal computing devices 20A, 20B, 20C via a USB cable 34, and a 48 VDL power supply cable 36. The control device 28 may include any combination of circuitry, hardware, firmware, and/or software mounted in or on a protective housing and includes a lighted circuit breaker switch 38. When used to transfer a motor program to a replacement motor 14 as described below, the control device 28 converts an incoming USB signal to a serial data signal that is delivered to the replacement motor.

Embodiments of the present invention may also comprise one or more computer programs stored in or on computer-readable medium residing on or accessible by the computers 16, 18, 20A, 20B, 20C or other components coupled with the system 10. The computer programs may comprise listings of executable instructions for implementing logical functions in the computers and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

One aspect of the invention provides systems and methods for gathering and storing data about original motors that may need to be replaced in the future. These systems and methods will now be described with reference to the flow chart of FIG. 3, which shows the functionality and operation of implementations of the present invention in more detail. Some of the blocks of the flow chart may represent a step or steps in a method or a module segment or portion of code of the computer programs of the present invention. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

Figure 3:
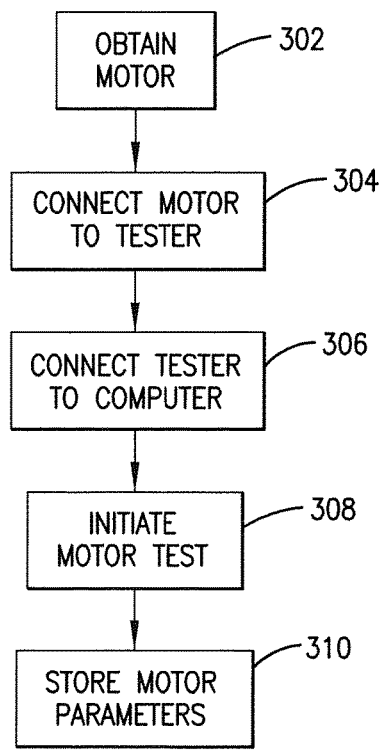
FIG. 3 is a flow diagram depicting steps in a method of the invention or portions of a computer program of the invention.

The portion of the invention depicted in FIG. 3 begins when a motor 12A to be tested is obtained as shown in block 302. Any number of motors may be obtained and tested, but to be useful for HVAC technicians, a substantial number of motors should be tested. Identification information and other information for each original motor to be tested is also obtained. Such information may include the motor's model number, HP rating, input voltage, manufacturer name, and other motor information and may be obtained from the motor itself, such as from a label on the motor, or from other sources. The motor information is then entered in the computer 16 and transferred to memory of the computer 18. In one embodiment, the information may be entered in a Performance Test screen shown in FIG. 5 that is implemented by a computer program on the computer 16 or the computer 18.

The motor 12A is then connected to the motor tester 24 as shown in block 304, and the motor tester is connected to the computer 16 as shown in block 306. The motor 12A can be connected to the motor tester 24 by any conventional motor cabling, and the motor tester can be connected to the computer 16 by a USB cable or other computer cable. The tester then initiates a motor test as shown in block 308. This may be done by clicking a button or icon on the screen of FIG. 5.

Figure 5:
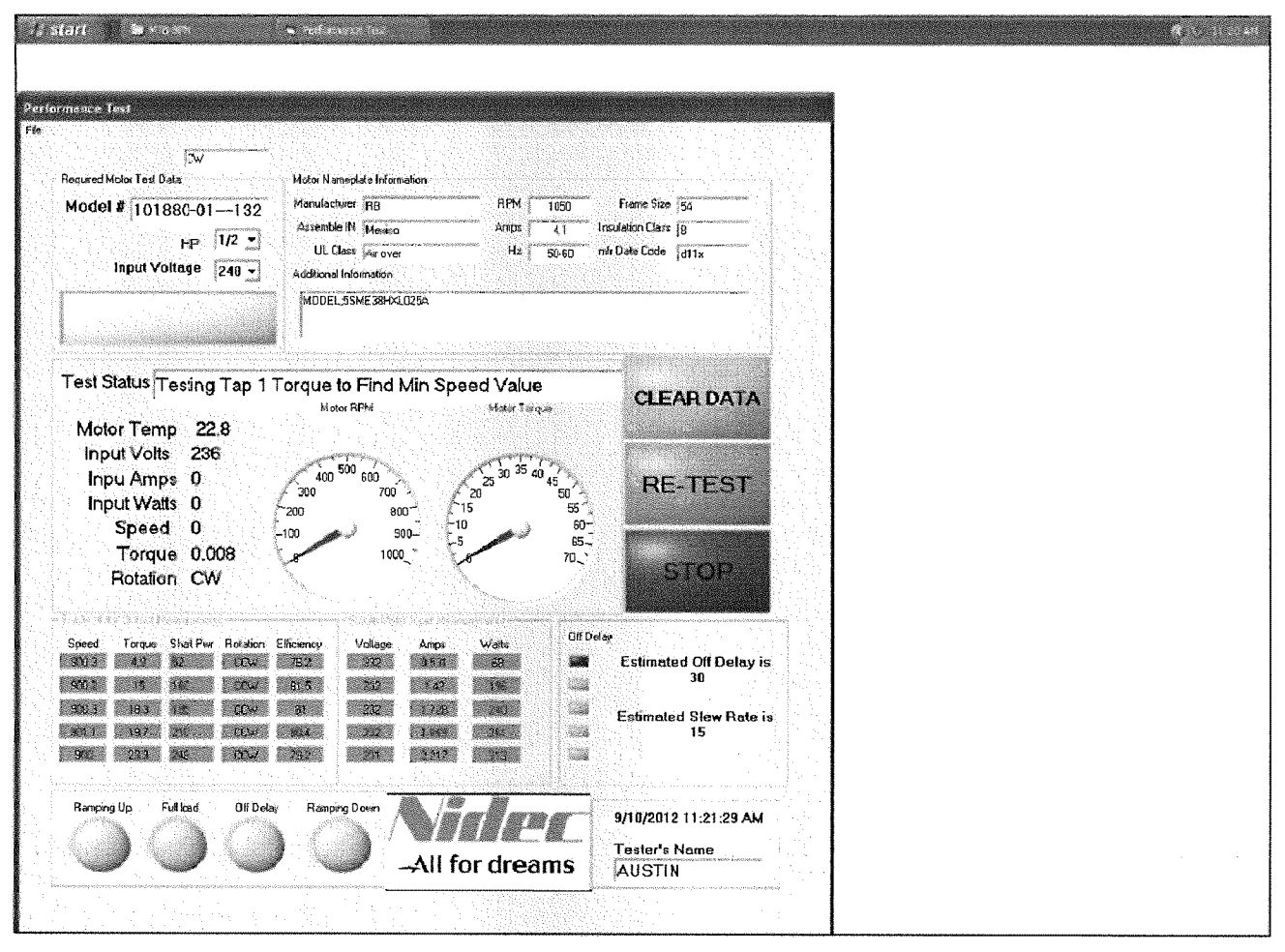

Once a test is initiated, the computer 16 and/or the motor tester 24 determine certain operational parameters of the motor 12A. The performance test screen of FIG. 5 illustrates a particular test in which the motor tester determines the motor's: minimum operating speed, maximum operating speed, slew rate or acceleration rate, torque settings for each tap, speed settings for each tap, any on-delays (delays in motor start-up after heating or air-conditioning is triggered), any off-delays (delays in motor shut down after heating or air-conditioning is stopped), and motor direction for each tap setting.

After a test is complete, the tested motor's identification information and operational parameters are stored in memory. In one embodiment, a database of such information is created and stored in memory accessible by the computer system 18 so that it can later be accessed by other computers in communication with the computer 18 such as the personal computing devices 20A, 20B, 20C.

The above-described procedures are then repeated for motor 12B and other original motors until a database containing identification information and operational parameters is created for numerous motors. The original motors of course don't have to be tested at the same time, as the database can be created and supplemented over time as more motors are obtained and tested.

After an original motor 12A, 12B has been tested, a program is created that can be used to program one of the replacement motors 14 to substantially mimic the operational parameters of the original motor. In one embodiment, the program sets the replacement motor's: minimum operating speed, maximum operating speed, slew rate or acceleration rate, torque settings for each tap, speed settings for each tap, on-delays, off-delays, and motor direction for each tap setting. The program for each original motor may be stored along with the test data described above or in other memory.

Identification information for the replacement motors may also be stored in the above-described database or another database or memory. For example, the model number, horsepower rating, input voltage, and similar information may be gathered for each replacement motor and stored in memory accessible by the computer 18.

Figure 4:
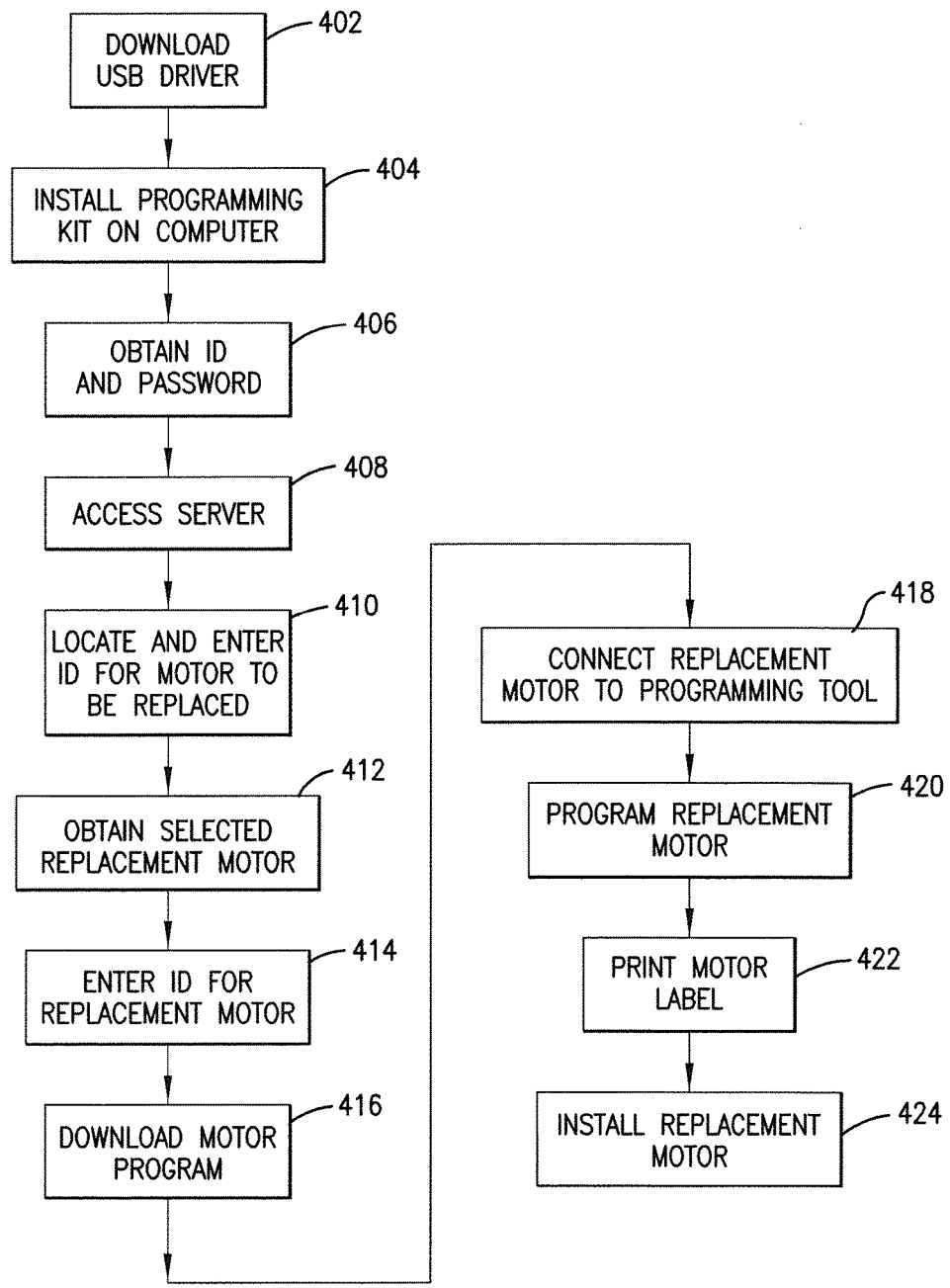
FIG. 4 is another flow diagram depicting steps in another method of the invention or portions of another computer program of the invention.

Another aspect of the invention provides systems and methods for selecting replacement motors and for programming the replacement motors to mimic certain operational parameters of the original motors being replaced. Such systems and methods for selecting and programming replacement motors will now be described in more detail with reference to the flow chart of FIG. 4, which shows the functionality and operation of implementations of the present invention in more detail. In this regard, some of the blocks of the flow chart may represent a step or steps in a method or a module segment or portion of code of the computer programs of the present invention. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

As shown in block 402, a USB driver is first downloaded from the computer system 18 to one of the personal computing devices 20A, 20B, 20C. The USB driver permits the personal computing device to download motor programs from the computer 18 and to transfer them to replacement motors via the programming tool 26.

A programming kit is then installed on one of the personal computing devices as shown in block 404. The programming kit allows the personal computing device 20A to program a replacement motor 14 with the operational parameters of an original motor as described in more detail below. In one embodiment, the programming kit is installed on the personal computing device 20A with the programming tool 26. Specifically, the installer plugs the programming tool 26 into a conventional wall socket then connects it to the personal computing device 20A via the USB cable 34 or other cable. The power switch 38 on the programming tool is then turned on. The operating system on the personal computing device 20A may then display "Found New Hardware Wizard". The installer then locates and opens the USB Driver previously downloaded as described above and installs the programming kit as directed by prompts. The installer may also be asked to call, email, or otherwise contact an authorized person to obtain a log-in ID and password as shown in block 406.

Once the personal computing device 20A has been properly configured, the installer may use it to select and program a replacement motor 14 for an original motor being replaced. To do so, the installer accesses the computer 18 via the communications network as shown in block 408. The user may be required to enter his or her log-in ID and password as part of this step.

The computer 18 then prompts the installer to enter the serial number, part number, or other identification information for the original motor to be replaced as shown in block 410. This information is typically shown on the motor's label. The computer 18 may even display sample motor labels to assist the installer in finding the requested identification information.

The computer 18 then uses the entered identification information to search the database to see if it matches the identification of any of the tested motors. If it does, the computer 18 may display the horsepower, voltage, max RPMs, amperage rating, and/or other information stored in memory for the tested motor and ask the installer to compare this information to the same information on the label of the motor being replaced to confirm the installer has entered the correct motor ID (and to confirm the database has the correct motor information).

Once the installer has confirmed the information for the original motor, the computer 18 selects the best replacement motor for the original motor. The computer 18 may do this by comparing the horsepower rating of the original motor to the horsepower ratings of the replacement motors and selecting the replacement motor with the same or closest horsepower rating.

The computer 18 then displays the serial number, model ID, or other identification for the selected replacement motor so that the installer may retrieve the appropriate motor from his or her service truck or from another source. The computer 18 may also prompt the installer to enter the serial number for the retrieved replacement motor as shown in block 414 to confirm that the installer retrieved the proper motor. The computer 18 then prompts the installer to click a displayed button or link when he or she is ready to begin programming the replacement motor as shown in block 416.

Before programming the replacement motor 14, the programming tool 28 must be connected between the computer 20A and the replacement motor 14 and the programming tool must be connected to an electrical outlet as shown in block 418. The installer then clicks the displayed button or link to begin downloading the program to the replacement motor as shown in block 420. As mentioned above, the programming tool converts the USB signal from the computer 20A to a serial data signal while programming the motor 14.

Once the replacement motor 14 has been programmed, it will operate in the same way as the original motor. Specifically, it will have substantially the same minimum operating speed, maximum operating speed, slew rate or acceleration rate, torque settings for each tap, speed settings for each tap, on-delays, off-delays, and motor direction for each tap setting as the original motor.

The computer 18 may also create a replacement label for the replacement motor 14 and prompt the installer to print it and attach it to the replacement motor as shown in block 422. This provides notice to future service people that the replacement motor 14 has been programmed to mimic the operation of the original motor. The installer may then install the programmed replacement motor into the HVAC system or other electrical device or system as shown in block 424.

Although the invention has been described with reference to the embodiments illustrated in the attached drawing figures, it is noted that equivalents may be employed and substitutions made herein without departing from the scope of the invention as recited in the claims. For example, although the methods and systems of the present invention are particularly useful for selecting and programming replacement motors for HVAC systems, they may also be used in other applications such as dishwashers, washing machines, etc.

Having thus described the preferred embodiment of the invention, what is claimed as new and desired to be protected by Letters Patent includes the following:

1. A method of developing a database of motor replacement information, the method comprising:
   operating a plurality of motors under test conditions;
   monitoring operating parameters of the motors under the test conditions via a computer system; and
   storing motor test data for each motor on a non-transitory computer-readable medium of the computer system, the motor test data comprising the operating parameters.

2. The method of claim 1, further comprising connecting the motors to a motor tester, wherein the operating parameters are monitored via the motor tester.

3. The method of claim 2, further comprising communicatively coupling the motor tester to the computer system and instructing the motor tester to transmit the motor test data to the computer system.

4. The method of claim 1, wherein operating one of the motors under test conditions is performed via motor testing software residing on the computing system.

5. The method of claim 1, wherein storing the motor test data on the non-transitory computer-readable medium of the computer system includes entering some of the motor test data into a web-based portal.

6. The method of claim 1, wherein the operating parameters include at least one of speed, torque, tap settings, and delays, and motor direction.

7. The method of claim 1, further comprising:
   instructing the computer system to create a plurality of programs each configured to mimic operational parameters of one of the motors, each program being configured to set at least one of a torque, a maximum speed, a minimum speed, a direction, a slew rate, an on-delay, or an off-delay; and
   storing the programs on the non-transitory computer-readable medium of the computer system.

8. The method of claim 1, further comprising:
   connecting the motors to a motor tester;
   communicatively coupling the motor tester to the computer system;
   instructing the motor tester to transmit the motor test data to the computer system;
   instructing the computer system to create a plurality of programs each configured to mimic operational parameters of one of the motors, each program being configured to set at least one of a torque, a maximum speed, a minimum speed, a direction, a slew rate, an on-delay, or an off-delay; and
   storing the programs on the non-transitory computer-readable medium of the computer system,
   wherein storing the motor test data on the non-transitory computer-readable medium of the computer system includes entering motor identification information and/or some of the motor test data into a web-based portal.

9. A method of developing a database of motor replacement information, the method comprising:
operating a first motor under test conditions;
monitoring operating parameters of the first motor under the test conditions via a computer system;
storing motor test data for the first motor on a non-transitory computer-readable medium of the computer system having motor test data for other motors stored thereon, the motor test data of the first motor comprising the operating parameters.

10. The method of claim 9, further comprising connecting the first motor to a motor tester, wherein the operating parameters are monitored via the motor tester.

11. The method of claim 10, further comprising communicatively coupling the motor tester to the computer system and instructing the motor tester to transmit the motor test data to the computer system.

12. The method of claim 9, wherein operating the first motor under test conditions is performed via motor testing software residing on the computing system.

13. The method of claim 9, wherein storing the motor test data for the first motor on the non-transitory computer-readable medium of the computer system includes entering some of the motor test data for the first motor into a web-based portal.

14. The method of claim 9, further comprising:
instructing the computer system to create a program configured to mimic operational parameters of the first motor, the program being configured to set at least one of a torque, a maximum speed, a minimum speed, a direction, a slew rate, an on-delay, or an off-delay; and
storing the program on the non-transitory computer-readable medium of the computer system.

15. The method of claim 9, further comprising:
connecting the first motor to a motor tester;
communicatively coupling the motor tester to the computer system;
instructing the motor tester to transmit the motor test data of the first motor to the computer system;
instructing the computer system to create a program configured to mimic operational parameters of the first motor, the program being configured to set at least one of a torque, a maximum speed, a minimum speed, a direction, a slew rate, an on-delay, or an off-delay; and
storing the program on the non-transitory computer-readable medium of the computer system,
wherein storing the motor test data of the first motor on the non-transitory computer-readable medium of the computer system includes entering motor identification information and/or some of the motor test data of the first motor into a web-based portal.

\* \* \* \* \*